United States Patent [19]

Long et al.

[11] 4,367,197

[45] Jan. 4, 1983

[54] METHOD FOR THE CONTROL OF EXCESSIVE CORROSION IN PHOSPHORIC ACID CIRCUITS

[75] Inventors: Gary L. Long; Roger B. Humberger, both of Pocatello, Id.

[73] Assignee: J. R. Simplot Company, Boise, Id.

[21] Appl. No.: 238,061

[22] Filed: Mar. 2, 1981

Related U.S. Application Data

[62] Division of Ser. No. 76,574, Sep. 18, 1979, Pat. No. 4,277,454.

[51] Int. Cl.³ .................. C01B 25/225; C01B 25/226; C23F 11/04
[52] U.S. Cl. ........................................ 422/3; 204/147; 422/12; 423/10; 423/18; 423/320; 436/6
[58] Field of Search .................. 422/3, 12; 23/230 A, 23/230 C; 423/320; 204/147

[56] References Cited

U.S. PATENT DOCUMENTS

| | | | |
|---|---|---|---|
| 2,854,497 | 9/1958 | Piehl | 422/12 X |
| 3,027,236 | 3/1962 | Cosway et al. | 422/12 X |
| 3,116,178 | 12/1963 | Upham | 422/12 X |
| 3,649,167 | 3/1972 | Sawyer | 422/3 |
| 3,935,298 | 1/1976 | Sugahara et al. | 423/320 |
| 4,101,638 | 7/1978 | Knoue et al. | 423/320 |

FOREIGN PATENT DOCUMENTS 592746 6/1976 U.S.S.R. .............................. 423/320

*Primary Examiner*—Barry S. Richman
*Attorney, Agent, or Firm*—Fulwider, Patton, Rieber, Lee & Utecht

[57] ABSTRACT

Methods for control of excessive corrosion in wet process phosphoric circuits are effected by oxidation of reduced ion species in the acid with maintenance of EMF value of the acid above about 190 millivolts (S.C.E. reference) through the digestion circuit. Supplementary monitoring is by a ceric red-ox titration procedure. In one embodied form, the present invention is utilized to control corrosion in a phosphoric acid plant digestion system (and subsequent processing equipment) operating by a dihydrate (gypsum) process even when such a process employs a calcined western U.S. phosphate ore feed from a relatively highly carbonaceous ore. The invention is also applicable for treating wet process phosphoric acid in phosphoric acid plants having a digester system operating by a hemihydrate process. In a presently preferred embodiment, additions of manganese dioxide to a primary digester in a sufficient amount effective to achieve an EMF value over about 190 millivolts will significantly control the occurrence of excessive corrosion in phosphoric acid circuits. In yet another preferred embodiment, an oxygen autoclave oxidation is used to oxidize the reduced ion species present in the acid to inhibit corrosion.

6 Claims, 2 Drawing Figures

METHOD FOR THE CONTROL OF EXCESSIVE CORROSION IN PHOSPHORIC ACID CIRCUITS

This is a division of application Ser. No. 76,574, filed Sept. 18, 1979, now U.S. Pat. No. 4,277,454 issued July 7, 1981.

BACKGROUND OF THE INVENTION

This invention relates to a method for control of excessive corrosion in phosphoric acid circuits by oxidation of reduced ion species in wet process phosphoric acid with elevation of the valence state of certain dissolved reduced ion species such as ferrous iron ($Fe^{+2} \rightarrow Fe^{+3}$), uranium ($U^{+4} \rightarrow U^{+6}$), and vanadium ($V^{+3} \rightarrow V^{+4}$), among others.

In this respect, phosphoric acid is commercially produced by one of two methods; "furnace" or "wet process". In the "wet process" method, the phosphate ore is contacted with a mineral acid, such as sulfuric, to extract phosphate values. In the process many other metallic compounds present in the ore are also dissolved by the acid and remain in the phosphoric acid solution. For a reduction in acid corrosivity it is necessary to raise the valence states of these and other metals. The raising of these ion valence states is called oxidation.

Phosphate ore used in the production of phosphoric acid typically goes through a variety of processing stages to upgrade the ore, by removing some impurities before introduction into a digester circuit for the production of wet process phosphoric acid. The character of the ore used from one mining site to another can change dramatically; that is, impurities levels can vary widely, without affecting the processing of the ore with sulfuric acid to produce phosphoric acid.

The oxidation state of several impurities which are soluble in the digestion system are thought to be affected by the impurity mineral source as well as the reductive capabilities of carbonaceous material which is contained in some ores. Although calcination can be a processing step for ore preparation, it is thought that the presence of carbon can have the effect of increasing the proportions of some reduced metal species in the resulting calcined ore and hence in the resulting acid in a production system. One purpose of calcination is to oxidize organic carbon in the ore to give an ore feed to the phosphoric acid digesters that yields a more filterable gypsum. However, in practice this removal of carbon is never complete as proven by analysis. Steps can be taken to improve the calcination by improving the reaction kinetics. These include increasing the calcination temperature and insuring excess oxygen in the gas phase. However, the demand for maintaining production rates, the limitation of averting fusion of the ore in the calciners and operating limits of the equipment pose practical limits. The presence of organic carbon in the original ore favored the stability of reduced forms of accessory minerals; the presence of residual carbon in the calcined ore reflects a reducing environment as has been confirmed by the fact that a very highly reduced wet process phosphoric acid is at times produced from the calcined ore. The metal species which are affected most in the phosphoric acid are iron, vanadium and uranium. With large amounts of carbonaceous materials in the ore the tendency is to produce the reduced ion form of these metals which is $Fe^{+2}$, $V^{+3}$ and $U^{+4}$, respectively.

The addition of most chemical oxidants to a wet process phosphoric acid system is either relatively ineffectual or not desirable, and a prescribed kind of oxidation and its control are necessary. For example, aeration in a primary digester of a phosphoric acid circuit with a computed sufficient amount of air at near ambient pressure appeared to be fairly ineffectual in destroying the strong reducing property of the acid and in avoiding activation toward corrosion (creating passivation) of the stainless steel and other alloy components in the system. Nitric acid additions lead to the evolution of toxic fumes of nitrogen oxides and may lead to corrosion by another mechanism. Sodium chlorate, while a good oxidant, can cause corrosion by another mechanism due to the rise in chloride level in the acid, particularly if the addition is not well controlled. Even $MnO_2$ additions, one of the embodiments of this invention, require proper control because the resulting $Mn^{+2}$ reaction product in the acid can cause some deleterious effects related to insoluble components in fertilizer products made from the acid if its additions are not properly controlled.

One method of the present invention therefore provides oxygen autoclave oxidation of wet process phosphoric acid at specified process parameters including pressure, temperature, mixing conditions and location of treatment with maintenance of EMF through the digestion process to thereby significantly increase oxidation of reduced ion species in the system for corrosion control.

The effect of oxidative molecules or ions on corrosion rates on stainless steels and other alloys (passivation) has long been recognized. "Corrosion Resistance of Metals and Alloys," 2nd Ed. Reinhold Publishing Corp., New York, pages 397–400, 1963 (A.C.S. Monograph Series), discussed the corrosiveness of phosphoric acid, although the discussion refers to data on laboratory grade phosphoric acid, not wet process acid. To our knowledge, however, a successful method of the use of oxidants to limit corrosion in wet process phosphoric digester circuits had not been successfully evolved. This is attributed to the special problems of this impure acid slurry system, to the constant replenishment of reductants and reduced ions in the process from the ore, to the high levels of reduced species in solution where they activate corrosion and to the necessity of monitoring and controlling the oxidation process. The present invention achieves this corrosion control without incurring severe deleterious effects from oxidants and complements other established methods of corrosion control in phosphoric acid circuits including insuring an adequate supply of reactive silica in the digesters and limiting the level of chloride.

The invention describes a workable means of maintaining and controlling the system to limit corrosion by changing the composition of the wet process acid to a less corrosive solution. The invention also provides means of predicting the corrosiveness of the acid.

SUMMARY OF THE INVENTION

In accordance with the present invention, methods for control of excessive corrosion in phosphoric acid circuits are effected by oxidation of reduced ion species present in the acid and maintenance of EMF values above about 190 millivolts through the digestion process.

Supplementary red-ox characterization and monitoring of the acid can be achieved by ceric bisulfate titration of an analyzed sample of the acid in 10% sulfuric acid.

In one embodied form, the present invention is utilized to control corrosion in a phosphoric acid plant digestion system operating by dihydrate (gypsum) process even when such process employs a calcined western U.S. phosphate ore feed derived from ore with relatively high amounts of carbonaceous materials. The invention is also applicable for treating wet process phosphoric acid in phosphoric acid plants having a digester system operating by a hemihydrate process.

In more detail, when corrosion control is to be effected in a phosphoric acid plant digestion system operating by a dihydrate process, a temperature range of 165°–185° F. is maintained through the digesters, a temperature range of about 165°–174° F. is maintained through the filter and a temperature of about 160°–185° F. is maintained in the bulk phase of acid through evaporators. In a phosphoric acid plant digestion system operating by a hemihydrate process, a temperature of about 160°–205° F. is maintained through the hemihydrate digesters and a temperature of below about 180° F. is maintained through the filter of the hemihydrate digestion section. The hemihydrate system may also include evaporators which should be maintained at below about 185° F. In a presently preferred embodiment, additions of manganese dioxide to a primary digester in a sufficient amount effective to achieve an EMF value over about 190 millivolts will significantly control the occurrence of excessive corrosion in phosphoric acid circuits.

In yet another preferred embodiment an oxygen autoclave oxidation method is used to oxidize the reduced ion species present in the acid for inhibiting corrosion. Accordingly, the use of deleterious chemical oxidants is avoided, especially such oxidants that can themselves cause corrosion and supply deleterious amounts of impurities.

Other features and advantages of the present invention will become apparent from the following detailed description, taken in conjunction with the accompanying claims which will illustrate by way of example, the principles of the present invention.

BRIEF DESCRIPTION OF THE DRAWINGS

The accompanying drawings illustrate the invention. In such drawings.

DESCRIPTION OF THE PREFERRED EMBODIMENT

Figure 1:
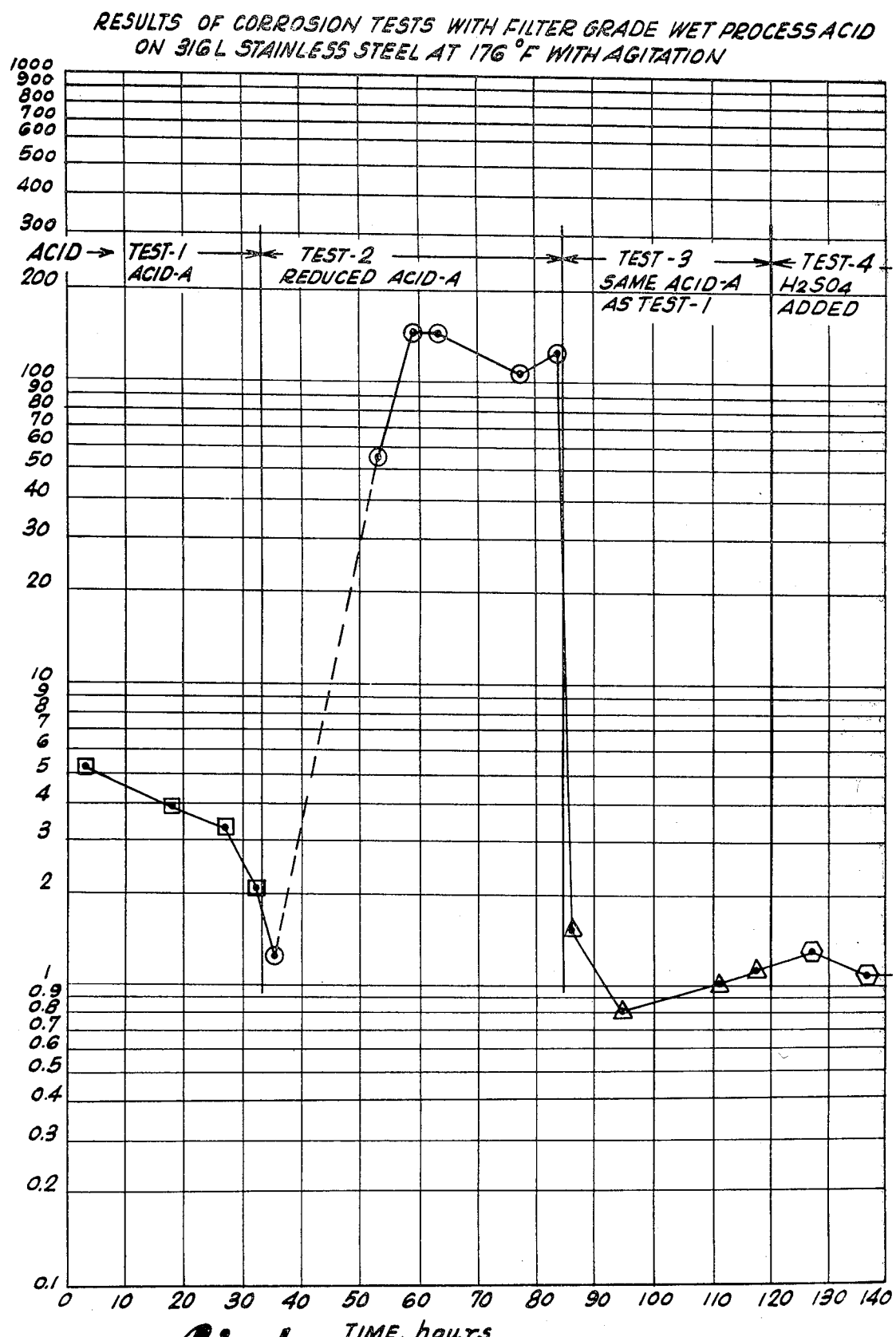
FIG. 1 illustrates results of the corrosion tests with filter grade wet process phosphoric acid on 316 L stainless steel at 176° F.

This invention relates to a method for control of excessive corrosion in phosphoric acid circuits by oxidation of reduced ion species in phosphoric acid, including wet process phosphoric acid by elevation of the valence state of certain dissolved reduced ion species such as ferrous iron ($Fe^{+2} \rightarrow Fe^{+3}$), uranium ($U^{+4} \rightarrow U^{+6}$), and vanadium ($V^{+3} \rightarrow V^{+4}$), among others.

Phosphate ore used in the production of phosphoric acid typically goes through a variety of processing stages to upgrade the ore by removing some impurities before introduction into a digestion circuit for the production of wet process phosphoric acid. The character of the ore used from one mining site to another can change dramatically; that is, impurities levels can vary widely, without affecting the processing of the ore with sulfuric acid to produce phosphoric acid. Typically, western U.S. phosphate rock is calcined and ground before it enters an attack tank in the digestion circuit.

Some digestion circuits are operated by a dihydrate process, while other digestion circuits are operated by a hemihydrate process. In either instance, some corrosion in the plants is a normal occurrence. Although some digestion circuits do not typically experience excessive corrosion, a variation in ore composition can create occasional periods of excessive corrosion. Examination of equipment failures in one such plant revealed general corrosion, corrosion-erosion and intergranular corrosion as the major types of corrosion experienced.

Corrosion investigation was then conducted examining (1) plant operating parameters; (2) speed and rotation of equipment; (3) mechanical condition of the plants; (4) chemical analysis for: a. Known corrosive agents in phosphate rock and sulfuric acid, b. shifts of chemical impurities in the rock, c. chemical additives to the plant; and (5) EMF measurement.

The foregoing investigation revealed that operating conditions were virtually unchanged and that all equipment was mechanically sound and speed and rotation were within accepted design limits. Chemical analysis indicated normal F/Si ratios and chloride levels for that phosphoric acid complex.

Analysis of the phosphate rock indicated a progressive decrease in the $P_2O_5$ content. It was discovered that with a decrease in $P_2O_5$ content a gradual increase in the metal impurities in the rock was apparent.

EMF measurements were made of the product phosphoric acid to determine its corrosion potential. Such measurements varied through a range of about 140 to about 300 m.v.

Although, the present invention is not to be bound by the following theoretical discussion, information gathered by the inventors suggests one or more mechanisms creates the excessive corrosion problem: (1) the chemical composition of the digestion system of construction materials requires that a passive surface be maintained on wetted metal surfaces or corrosion will increase; (2) the materials that were failing had passed from the passive surface range to an active surface range; and (3) one cause of the excessive corrosion was the presence of reduced Iron and Vanadium species in the phosphoric acid.

The following remedies were initially considered as possible solutions to the corrosion problem: (1) Change to materials of construction with better resistance to corrosion; (2) Coating the materials of construction; and/or (3) Alter the environment to reduce the corrosive condition.

The original major material of construction of the equipment in the phosphoric acid digester circuit evaluated was 316 L stainless steel. Accordingly, one alternative to corrosion control investigated was the selection of more corrosion resistant materials such as Carpenter 20 CB3; alloy 20; 317 S.S.; illium; Hasteloy B; Hasteloy G; Incoloy 825; and ferralium.

Plastics were also investigated as an alternative material in some areas, but mechanical problems prevent adoption in the digestion circuit of most wet process plants. Although coating the materials of construction was another alternative investigated in parts of the digestion circuit such coatings are generally removed in a relatively short period of time by internal abrasion caused by the flow of the acidic phosphate rock slurry.

Accordingly, an attempt was made to improve oxidation of the ore in the calciners by increasing temperatures and insuring adequate levels of free oxygen in the gas phase. These process parameters were changed to improve the degree of oxidation of ore in the calciners to yield a higher EMF (more oxidizing) product acid from the calcined ore. This goal was not consistently achieved with all ore types and under the demand of high production rates.

In accordance with one presently preferred embodiment of the present invention, the addition of manganese dioxide $MnO_2$ to the circuit digesters, was determined to have significant influence on EMF values and reduce corrosion rates. However, those skilled in the art will appreciate associated grade control and impurity related problems in super acid (highly concentrated $P_2O_5$) facilities, which could be contributed to by $MnO_2$ addition.

With these factors causing excessive corrosion being ascertained, the best approach to control the occurrence, was determined to be the autoclave oxygen oxidation of the phosphoric acid and the control of temperature and EMF values through the digestion system.

In this regard, phosphate ore used in the production of phosphoric acid typically goes through a variety of processing stages to upgrade the ore, by removing some impurities before introduction into a digester circuit for the production of wet process phosphoric acid. The character of the ore used from one mining site to another can change dramatically; that is, impurities levels can vary widely, without affecting the processing of the ore with sulfuric acid to produce phosphoric acid.

The oxidation state of several impurities which are soluble in the digestion system is thought to be affected by the impurity mineral source as well as the reductive capabilities of carbonaceous material which is contained in some ores. Although calcination can be a processing step for ore preparation, it is thought that the presence of carbon can have the effect of increasing the portions of some reduced metal species in the resulting calcined ore and hence in the resulting acid in a production system. One purpose of calcination is to oxidize organic carbon in the ore to give an ore feed to the phosphoric acid digesters that yields a more filterable gypsum. However, in practice this removal of carbon is never complete as proven by analysis. Steps can be taken to improve the calcination by improving the reaction kinetics. These include increasing the calcination temperature and insuring excess oxygen in the gas phase. However, the demand for maintaining production rates, the limitation of averting fusion of the ore in the calciners and operating limits of the equipment pose practical limits. The presence of organic carbon in the original ore favored the stability of reduced forms of accessory minerals; the presence of residual carbon in the calcined ore reflects a reducing environment as has been confirmed by the fact that a very highly reduced wet process phosphoric acid is at times produced from the calcined ore. The metal species which are affected most in the phosphoric acid are iron, vanadium and uranium. With large amounts of carbonaceous materials in the ore the tendency is to produce the reduced ion form of these metals which is $Fe^{+2}$, $V^{+3}$ and $U^{+4}$, respectively.

In accordance with the present invention, methods for control of excessive corrosion in phosphoric acid circuits are effected by oxidation of reduced ion species present in the acid and maintenance of EMF values above about 190 millivolts through the digestion process.

Supplementary red-ox characterization and monitoring of the acid can be achieved by ceric bisulfate titration of an analyzed sample of the acid in 10% sulfuric acid to determine the total reduced metal ions to total oxidized metal ions ratio, with control of excessive corrosion being effected by maintenance of this ratio at a value of less than about 4.0.

In one embodied form, the present invention is utilized to control corrosion in a phosphoric acid plant digestion system operating by dihydrate (gypsum) process even when such process employs a calcined western U.S. phosphate ore feed derived from ore with relatively high amounts of carbonaceous materials. The invention is also applicable for treating wet process phosphoric acid in phosphoric acid plants having a digester system operating by a hemihydrate process.

In more detail, when corrosion control is to be effected in a phosphoric acid plant digestion system operating by a dihydrate process, a temperature range of 165°–185° F. is maintained through the digesters, a temperature range of about 165°–174° F. is maintained through the filter and a temperature of about 160°–185° F. is maintained in the bulk phase of acid through evaporators. In a phosphoric acid plant digestion system operating by a hemihydrate process, a temperature of about 160°–205° F. is maintained through the hemihydrate digesters and a temperature of below about 180° F. is maintained through the filter of the hemihydrate digestion section. The hemihydrate system may also include evaporators which should be maintained at below about 185° F. In a presently preferred embodiment, additions of manganese dioxide to a primary digester in a sufficient amount effective to achieve an EMF value over about 190 millivolts will significantly control the occurrence of excessive corrosion in phosphoric acid circuits.

Optionally, the control process may also include oxygen autoclave oxidation. Since the uncontrolled use of most chemical oxidants is not desirable, in that they supply impurities and can cause corrosion via another mechanism (chloride) or interfere with processing of the acid product (manganese), an oxygen autoclave oxidation is a very applicable alternative for increasing the valence state of reduced species. Accordingly, this mode serves to oxidize the reduced acid, thereby inhibiting excessive corrosion but not adding impurities to the acid. If an oxygen autoclave is used for this method of corrosion control it is preferable to oxidize the No. 2 filtrate, the recycle stream returning from the filters to the digester of the digestion circuit required for steady state operation.

In one embodiment form, and for purposes of illustration, the autoclave oxidation and apparatus may be utilized for oxidizing reduced metal species of wet process phosphoric acid without required addition of conventional chemical oxidants. Accordingly, the acid solution containing treatable quantities of reduced ion species is supplied at a suitable flow rate to a sealed reaction vessel. A pure oxygen source, containing at least 94% by volume $O_2$, is typically supplied at from about 3 lbs. to 8 lbs. per 1,000 gallons of solution. The reduced ions species in the acid solution may comprise reduced metallic ions having a sufficiently low oxidation potential (electromotive potential) to be oxidized by oxygen. A representative group of such materials having such an oxidation potential include ferrous iron ($Fe^{+2} \rightarrow Fe^{+3}$), copper ($Cu^{+} \rightarrow Cu^{+2}$), vanadium ($V^{+3} \rightarrow V^{+4}$) and uranium ($U^{+4} \rightarrow U^{+6}$) among others.

More specifically, the apparatus in accordance with the present invention achieves a significant reduction in retention time when operated at specified process parameters of temperature, pressure and mixing conditions in an autoclaving environment. The pure oxygen oxidant is fed to the reaction vessel, such as an autoclave or suitable mixing vessel, having sufficient capacity to allow a distinct amount of vapor space and liquid space. Other methods of contacting the liquid and gas phases may also be used by those skilled in the art without departing from the scope of the invention.

Accordingly, the reaction vessel is operated at a temperature range of from about 80° F. to about 170° F. and preferably between about 120° F. to about 160° F. However, it has been determined that a temperature of greater than 170° F. may be utilized and will still result in an operable embodiment but without a significant decrease in mixture retention time. The reaction vessel is maintained at a pressure range of from about 60 psi to about 160 psi, and preferably within a pressure range of about 80 psi to about 150 psi. However, as with temperature, it has also been determined that the subject process will be operable at above 160 psi but without a significant decrease in mixture retention time.

The acid solution to be treated with the pure oxygen oxidant should have sufficient dispersion to supply good surface contact between the liquid and gas phases. In this regard, one preferable means for effecting such dispersion is provision of a 3-inch diameter impeller at the interface of the liquid -gas phase and a second impeller located lower in the liquid phase to allow good mechanical agitation of the liquid phase.

Typically, when such agitation means are utilized, a rotation of from about 300 rpm to about 600 rpm of the impeller is suitable. It is to be understood that this speed would vary considerably with the exact size and geometric design of the autoclave, and can be determined by those skilled in the art.

On a countercurrent phosphoric acid filter apparatus in accordance with this embodiment, the No. 2 filtrate exists as a weak phosphoric acid solution (18% $P_2O_5$) which is the second product from filtration. This acid is returned to the digestion circuit in large enough quantities so as to supply oxidant and therefore increase the ratio of $Fe^{+3}/Fe^{+2}$ in the digesting solution. The effect will be to raise the EMF of the digester slurry and decrease corrosion. For a further description of autoclave oxidation, reference may be had to co-pending U.S. application Ser. No. 72,304 entitled Method and Apparatus of Autoclave Oxidation of Ion Species in Aqueous Solutions, by the inventors Larry L. Bierman, Gary L. Long and David Bortner, filed on September 4, 1979.

For purposes of this description the term "EMF" is further explained as follows with symbols and notation those of F. Daniels and R. A. Alberty, "Physical Chemistry," Fourth Edition, John Wiley & Sons, New York, pages 205–209, 1975, and H. A. Strobel, "Chemical Instrumentation," Second Edition, Addison-Wesley, Reading, Mass., Sign convention for EMF, E:

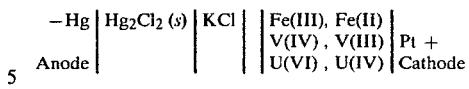

Left, saturated calomel electrode right, measured solution and indicator electrode $$E = E_{rt} - E_{S.C.E.} = \underset{rt \; Fe}{E° - \frac{RT}{NF} \ln \frac{C_{Fe(II)}}{C_{Fe(III)}}} - E_{S.C.E.} =$$

written as reduction $$\underset{rt \; V}{E° - \frac{RT}{NF} \ln \frac{C_{V(III)}}{C_{V(IV)}}} - E_{S.C.}$$

$E$ millivolts $= E_{rt} - (+244 \text{ mv at } 25° \text{ C.})$
$= E_{rt} - (+235 \text{ mv at } 35° \text{ C.}) = E_{rt} - E_{S.C.E.}$ For example, by this sign convention, measured EMF's for 30% $P_2O_5$ wet process acid containing about equal proportions of oxidized and reduced forms, CFe(III)+CV(IV)+CU(VI)=CFe(II) CV(III)+CU(IV), give a measured EMF vs S.C.E. of about 235 mv and the measured value decreases as the proportion of reduced forms increases. The measured EMF of 235 mv (S.C.E.) is equivalent to an EMF vs a normal hydrogen electrode reference of 479 mv at 25° C. An opposite signal convention could be applied equally well.

The above notation is in terms of formal potentials involving the ratio of total concentration of the reduced and oxidized species of a given metal. In fact, the EMF of wet process acid solutions is somewhat $P_2O_5$ concentration dependent with the EMF decreasing with increasing $P_2O_5$ concentration at a given ratio of reduced and oxidized forms in the EMF range of 100 to 550 mv (S.C.E.). Nevertheless, the criterion of this disclosure that the EMF be brought to 190 mv (S.C.E.) or higher is valid as it applies to about 30% $P_2O_5$ acid in a dihydrate process digester acid or acids of higher concentrations in a hemihydrate process or from an evaporator. EMF measurements as described here are not corrosion potentials because platinum, not the corroding alloy, is the indicating electrode. EMF measurements have the advantage of time independence. Chemical analysis and the ceric titration procedure afford a direct determination of total reduced metal ions to total oxidized metal ions ratio.

EMF measurements as applied here are not particularly temperature dependent, apparently because of near cancellation of effects by the indicating and measuring electrodes. EMF measurements are slightly excess sulfate dependent over the narrow concentration range involved here with the EMF increasing slight with increasing excess sulfuric acid.

The foregoing description and the following specific examples are for the purposes of illustration and are not to be considered as limiting the scope of the invention, reference being had to the appended claims for this purpose.

EXAMPLE I

Wet process phosphoric acid for this example was taken from a phosphoric acid plant digester system operating by a dihydrate (gypsum) process and employing a calcined Western U. S. phosphate ore feed.

Corrosion measurements were made with this acid and AISI Type 316L stainless stainless steel electrodes by means of a Petrolite Model M-103 corrosion rate instrument. This instrument utilizes the linear polarization technique and a three electrode system. For a further description, reference may be had to Michael Henthrone, *Chemical Engineering* "Fundamentals of Corrosion," Parts 3 and 4, 7/26/71-8/23/71. The electrodes were immersed in a stoppered polypropylene flask nearly filled with the acid and with nitrogen gas occupying the space above the acid. The acid was stirred with a magnetic stirrer and the temperature of the acid was maintained at 176°+0.4° F. Qualitative observations of the electrodes were made at the end of each test.

The acid was analyzed for constituents of major interest, and parallel samples were analyzed for other constituents.

In order to characterize the oxidation-reduction properties of the acid independent of the specific metal alloy subjected to corrosion measurements, EMF measurements on the acid were taken using Leeds and Northrop Model 7415 and Corning Digital 109 pH meters with a bright platinum indicator electrode and a saturated calomel reference electrode. The sign convention employed here for reporting this EMF data is explained above. In addition, the amount of reduced ion species present in test acids was determined by potentiometric titration of a sample of the acid in warm dilute $H_2SO_4$ solution with dilute ceric bisulfate solution. The mol ratios of reduced to oxidized species for acid in this EMF range are expressed here as [Fe(II)+V(III)]: [Fe(III)+V(IV)] without allowance for the low levels of U(IV) and U(VI) in these solutions.

Test 1: This test was on the "as is" acid with new 316 L electrodes. The same electrodes were used throughout this series of tests.

Test 2: This test was conducted on a portion of the same acid in which the amount of oxidized species, Fe(III) and V(IV), was further decreased by treatment of the acid with 0.336 grams aluminum metal/liter acid. At the termination of the reduction, residual metallic aluminum and hydrogen gas were removed from the sample before conducting the corrosion test. Aluminum was selected as reductant for these reasons: (1) In aqueous solution it is present in only one oxidation state, Al (III). (2) As shown below, Al (III) was already a significant impurity in the acid and present in amount much greater than the amount added. (3) The literature indicates that the presence of aluminum ion itself in wet process acid may, if anything, inhibit corrosion. For additional information regarding this inhibition reference may be made to Enrico Pelliti, "Phosphoric Acid," A. V. Slack, editor, Vol. 1, Part II, Marcel Dekker, Inc., New York, Chapter 10, 1968. (4) Purity of reagent and simplicity of addition and separation of any residual metal.

Test 3 was a repetition of Test 1. These two tests bracketed the test on highly reduced acid and served to check the effect of electrode exposure time.

The level of excess sulfate in the acid is an important process control variable in phosphoric acid plant. In Test 4, additional sulfuric acid was added to the original acid to test the significance of this plant control parameter. In Test 5, additional excess sulfate was added in the form of an ammonium sulfate—ammonium bisulfate strip liquor from a sulfuric acid plant scrubber system.

As a result of the foregoing tests it was concluded that the wet process acid used in this work contained the following approximate analysis:

29.95% $P_2O_5$
1.98% $SO_4$ (before any additions)
0.37% Total iron, reported as $Fe_2O_3$
0.112% Total vanadium, reported as $V_2O_5$ (1.495 g/l)
Specific gravity 1.340 at 75° F.

Samples of acid taken at about the same time and sampling point contained the following approximate analysis:

1.44-1.52% F
0.25-1.285% Si
0.87-0.98% $Al_2O_3$ (6.17-6.95 g Al(III)/l)
280 ppm Cl.

Table 1 gives the results of the EMF measurements and corrosion measurements plus supplementary information. The most significant corrosion test results are shown in FIG. 1.

In Test 1, the original (new) electrodes took some time to stabilize with the trend toward decreased corrosion (passivation). Even the initially measured corrosion rate was reasonably low (about 4.3 mpy). At the end of this test, the electrodes were bright and slightly scaled with a poorly adherent scale.

In Test 2, although the initially measured corrosion rate was low, after about 18 hours exposure the corrosion rate had risen by a factor of 10 over the maximum observed in Test 1. At the end of Test 2, the electrodes had a black film characteristic of the rapidly corroding alloy. In the presence of this acid, the alloy went from passive to actively corroding state.

In Test 3, repetition of Test 1 in which the electrodes now had considerable exposure to a corroding environment, the initially measured corrosion rate and all subsequent corrosion rates were low, about a factor of 100 lower than the last four measurements of Test 2.

The test prove: (1) The resistance to corrosion of the alloy in the 30% $P_2O_5$ wet process acid was very significantly decreased by extremely reducing conditions in the phosphoric acid with the reducing condition reflected by EMF and a low proportion and concentration of Fe(III) and V(IV); and (2) the resistance of corrosion can be fairly rapidly reestablished by return to more oxidizing conditions as reflected by EMF and an appreciable concentration and proportion of the oxidized ions.

TABLE I

RESULTS OF CORROSION TESTS WITH FILTER GRADE WET PROCESS ACID ON 316L STAINLESS STEEL AT 176° F. WITH AGITATION

| Test | Conditions | EMF (S.C.E. REF.) Millivolts | (Fe(II) + V(III))/(Fe(III) + V(IV)) Mol Ratio | Percent in Oxidized States (Fe(III) or V(IV)) | Time of Exp., hours Alloy | Time of Exp., hours Solution | Corrosion Rate, mils/year | Other Data & Observations |
|---|---|---|---|---|---|---|---|---|
| 1 | Acid A, As is 1.95% $SO_4$ | 193 in 178 out | 3.58 | 21.8 | 3 18 27 | 3 18 27 | 5.3 3.9 3.3 | Alloy bright at end of Test 1. No evi- |

TABLE I-continued
RESULTS OF CORROSION TESTS WITH FILTER GRADE WET PROCESS ACID ON 316L STAINLESS STEEL AT 176° F. WITH AGITATION

| Test | Conditions | EMF (S.C.E. REF.) Millivolts | $\frac{(Fe(II) + V(III))}{(Fe(III) + V(IV))}$ Mol Ratio | Percent in Oxidized States (Fe(III) or V(IV)) | Time of Exp., hours Alloy | Time of Exp., hours Solution | Corrosion Rate, mils/year | Other Data & Observations |
|---|---|---|---|---|---|---|---|---|
| 2 | Acid A, Reduced | 140 in 42 out | 29.2 | 3.3 | 32.3 | 32.3 | 2.1 | dence of pitting. Black coating observed on alloy after Test 2; corrosion residue. |
|   |   |   |   |   | 35.3 | 2 | 1.25 |   |
|   |   |   |   |   | 53 | 18 | 54 |   |
|   |   |   |   |   | 59 | 24 | 143 |   |
|   |   |   |   |   | 67 | 28 | 143 |   |
|   |   |   |   |   | 76.5 | 41.5 | 102 |   |
|   |   |   |   |   | 83 | 48 | 126 |   |
| 3 | Acid A, As Is Repeat of Test 1. | 193 in 184 out | 3.58 | 21.8 | 85.5 | 1.5 | 1.5 |   |
|   |   |   |   |   | 94 | 9 | 0.8 |   |
|   |   |   |   |   | 111 | 25 | 1.0 |   |
|   |   |   |   |   | 118.5 | 33.5 | 1.1 |   |
| 4 | Acid A with $H_2SO_4$ added to give 3.1% $SO_4$ | 193* in 194 out | 3.58 | 21.8 | 127 | 7 | 1.3 | Electrodes bright, some scaling. No evidence of corrosion. |
|   |   |   |   |   | 137 | 17 | 1.1 |   |
|   |   |   |   |   | 168 | 31 | 1.05 |   |
| 5 | Acid A with scrubber liquor added. 43.0 g Liquor/kg. 3.1% $SO_4^=$ in final acid. ppm $SO_2$ added = 0.95 ppm $SO_2$ in final acid. | — | — | — | 182 | 14 | 0.9 |   |
|   |   |   |   |   | 190.5 | 22.5 | 1.0 |   |

*Measured Prior to $H_2SO_4$ addition

In Tests 4 and 5, the low corrosion rates of Tests 1 and 3 still were observed when the sulfate level was increased from 1.98% to 3.1% $SO_4$ with the sulfate added as sulfuric acid or ammonium sulfate—bisulfate. This indicates that sulfate level is a less significant parameter in corrosion than the concentration and proportion of ions that are directly potential (EMF) determining in the acid, and Test 5 indicates that some of the sulfate can originate from an ammonium bisulfate—sulfate liquor containing trace amounts of $SO_2$.

Of course those skilled in the art will appreciate that any corrosion occuring tended to reduce the EMF of the test acid as a result of the corrosion reactions. This effect was marked for Test 2. The result proves that the corrosive effect of a low EMF acid tends to be self-propagating, but any such self-propagating effect may be less in a continuous flow plant except during downtime. EMF measurements are bulk solution measurements; even in a continuous process, the EMF of the bulk solution is probably higher than the EMF for the acid film immediately adjacent to an actively corroding alloy.

EXAMPLE 2

Wet process phosphoric acid of about 42 percent $P_2O_5$ concentration was collected from a corrosive production situation and stored under a nitrogen atmosphere to prevent possible air oxidation. The EMF of the acid was about 172 mv. After corrosion rates for 316 L stainless steel and Carpenter 20Cb-3 were measured, the acid was oxidized with $MnO_2$ increasing the EMF to 977 mv. The corrosion rates were again measured for 316 L and alloy 20. The results are as follows:

TABLE 2
RESULTS OF CORROSION TESTS ON 42% $P_2O_5$ WET PROCESS ACID AT 180° F. WITH AGITATION

| Alloy | Corrosion Rate mils/year Unoxidized Acid | Corrosion Rate mils/year Oxidized Acid |
|---|---|---|
| 316 L | 1615 | 9.5 |
| 20Cb-3 | 19 | 5.6 |

In the case of the 316 L stainless steel the corrosion rate was reduced by about 160 times. For the more corrosion resistant alloy 20Cb-3, the reduction was about three times. The corrosion probes developed a dark film after the test with unoxidized acid and 316 L. No such film was formed under the passive condition of oxidized acid. This is fairly conclusive evidence that corrosive wet process phosphoric acid will become less corrosive upon oxidation of the acid.

In this case, the oxidation was taken to the point where virtually all iron and uranium were present as the oxidized forms Fe(III) and U(VI) ($UO_2^{++}$) and the vanadium was dominantly present as V(V) ($VO_2^+$) with some V(IV) ($VO^{++}$) present.

The results with 316 L in this 42% $P_2O_5$ acid are particularly noteworthy in that this alloy has been observed to be a material of variable and marginal corrosion performance in hot 42% $P_2O_5$ wet process acid while it normally poses less of a problem in 30% $P_2O_5$ acid.

In accordance with the present invention, on the basis of the foregoing and following examples and tests, EMF's and a reasonably low reduced: oxidized ions ratio for acid in the phosphoric acid plant are key factors which have been determined to prevent excessive corrosion in phosphoric acid circuits.

To accomplish this end result, the digestion process can include additions of sufficient manganese dioxide to the primary digester to give an EMF over about 190 mv.

Although aeration technique described in the literature A.C.S. Monograph Series, "Corrosion Resistance of Metals and Alloys," Second Edition, Reinhold Publishing Corp., New York, Page 397–400, 1963, and Mars G. Fontana and Norbert D. Greene, "Corrosion Engineering McGraw—Hill, N.Y. pp. 335–337, 1967, is in principle beneficial and can be applied to the specific case of wet process phosphoric acid and wet process acid circuits, it is beneficial only if the desired reactions of reduced ions in solution have an opportunity to occur. To the inventors' knowledge, this has not been achieved and due to the slowness of reaction may not be applicable in a digester circuit.

This acid is distinguished from even furnace grade phosphoric acid by the high stoichiometric amount of reduced ions that can be present in a phosphoric acid circuit. In the digesters, reductants and reduced materials are continuously being added with the ore. This includes the reduced ions in the minerals, plus iron metal derived from grinding the ore and from transport equipment, and small amounts of sulfides that are evolved as $H_2S$ upon first contact with acid. In addition, $CO_2$ and $SiF_4$ gases and $H_2O$ vapor are evolved in the primary digester and flash coolers and these gases would tend to strip any dissolved oxygen from the acid. During operation, large amounts of reduced ions are constantly being added or formed in the circuit. An autoclave oxidation of No. 2 filtrate with $O_2$, as suggested above, would solve the problem of stoichiometry and kinetics, and allow oxidation of a high proportion of reduced ions.

No. 2 filtrate acid is returned to the digestion circuit directly to the primary (first) digester or to this digester via a flash cooler and in large enough quantities so as to supply oxidized ions and therefore decrease the ratio of $Fe(II)+V(III)$: $Fe(III)+V(IV)$ in the digesting solution. The effect is to raise the EMF of the digester slurry and decrease corrosion.

EXAMPLE 3

Figure 2:
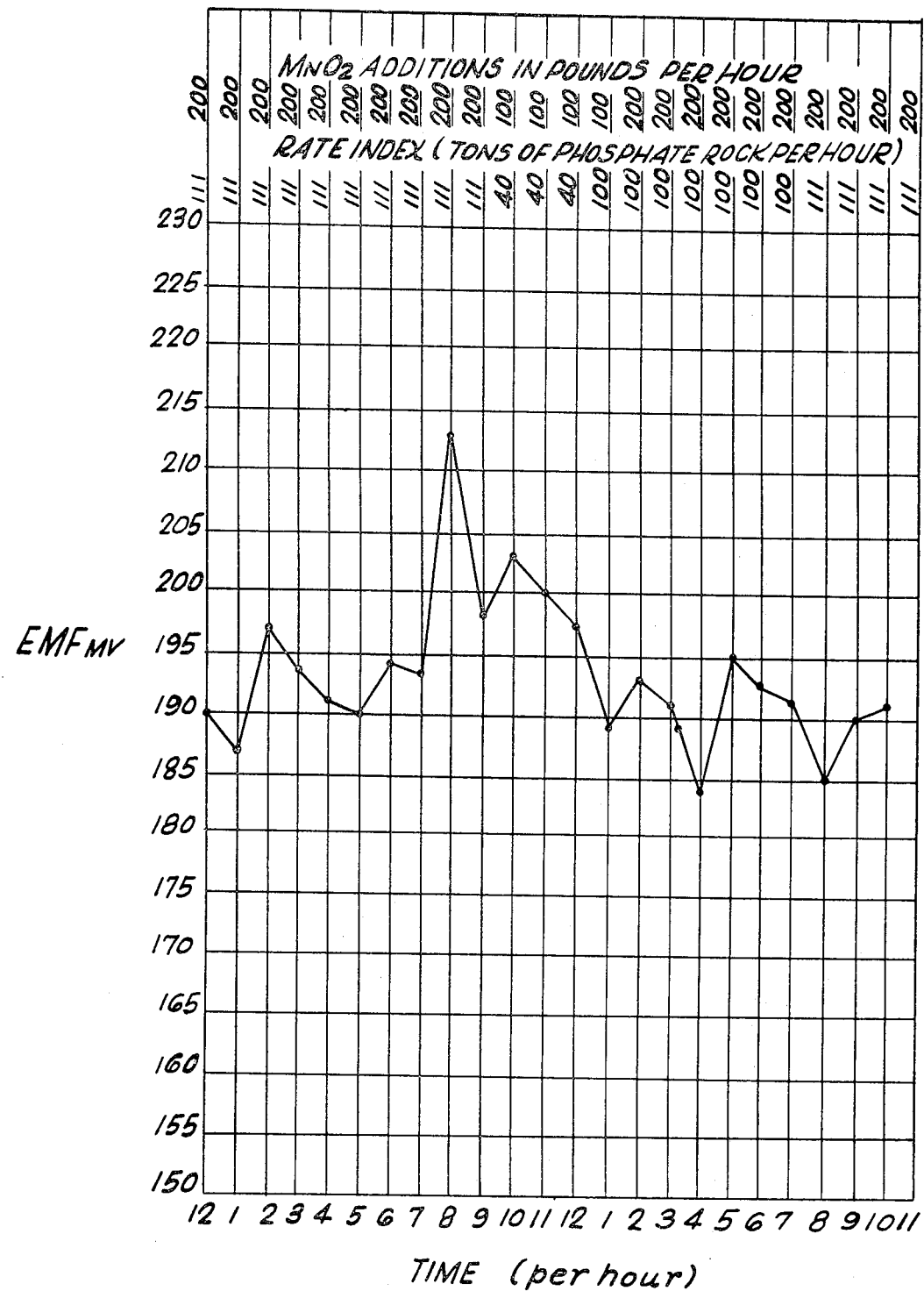
FIG. 2 illustrates EMF control in wet process phosphoric acid by the periodic addition of manganese dioxide.

In accordance with this invention a full scale plant application was employed over a period of two months. Native, minus 325 mesh 68% $MnO_2$ (available oxygen analysis basis) was added to the primary digester of a phosphoric acid (30% $P_2O_5$) dihydrate circuit. The EMF of the acid in the slurry was controlled above 190 mv the majority of the time by addition of a sufficient amount of $MnO_2$ each operating hour. EMF was the basis of control, but the control procedure was checked in the initial stages of the addition by the ceric titration method. FIG. 2 shows the type of EMF control achieved over a typical operating day during this period.

At the end of the application period, the primary digester was partly drained and the metal components of agitators, baffles and pumps examined by operating personnel. These metal parts included 316 L stainless steel, alloy 20Cb-3 and 317 stainless steel. There appeared to be a significant reduction in combined corrosion-erosion in the circuit relative to previous periods of operation. Further, there appeared to be no serious problems of corrosion in later stages of the plant, including the evaporators.

In addition, over this period, there appeared to be somewhat less scaling in the phosphoric acid plant. The scale in the plant is typically alkali fluorosilicates or gypsum and alkali fluorosilicates. The mechanism of any such scale inhibition by this process is not known but may be due to alteration of the scaling surfaces or a steadier state of complexation equilibria due to a more constant EMF.

EXAMPLE 4

Wet process phosphoric acid No. 2 filtrate (1S % $P_2O_5$) containing dissolved quantities of $Fe^{+2}$, $U^{+4}$, and $V^{+3}$ ion species from a digestion flow circuit is maintained at about 80°–100° F. minimum and preferably at about 140°–160° F. (a typical temperature of No. 2 filtrate in a dihydrate plant is 125° F.). The acid is then injected into a pressure autoclave containing an oxygen atmosphere. Pressure in the autoclave is regulated above 60 psig and about 100 psig if optimum oxidation is to be achieved. While in the autoclave the acid is mixed to allow good liquid/gas contact. In this respect, two double impeller, 10 horsepower mixers for 500 gpm of processed acid are used. Other combinations of mixing are obviously available; however, unless adequate gas/liquid contact is provided very poor oxidation will result.

Using the desired operating parameters about 80% oxidation to $Fe^{+3}$, $U^{+6}$, and $V^{+4}$ is obtained with less than 2 minutes retention time in the autoclave.

While particular forms of the invention have been illustrated and described, it will be apparent to those skilled in the art that various modifications can be made without departing from the spirit and scope of the invention.

We claim:

1. A method of controlling excessive corrosion in phosphoric acid circuits by oxidation of reduced ion species in wet process phosphoric acid slurry, comprising the steps of:
   measuring the total weight percent concentration of reduced ion species in the acid slurry;
   measuring the total weight percent concentration of oxidized ion species in the acid slurry;
   comparing the ratio of the total weight percent concentration of reduced ion species to the total weight percent concentration of oxidized ion species; and
   oxidizing a portion of the reduced ion species in the acid slurry when the value of said ratio is greater than or equal to about 4.0 to alter the value of said ratio to less than about 4.0.

2. The method of claim 1 wherein said oxidizing step comprises adding manganese dioxide in an amount sufficient to alter the value of said ratio to less than about 4.0.

3. The method of claim 1 wherein said oxidizing step comprises oxidizing the reduced ion species in an oxygen autoclave.

4. The method of claim 1 wherein the reduced ion species comprises iron and vanadium, and wherein said steps of measuring the total weight percent concentration of reduced ion species and the total weight percent concentration of oxidized ion species in the acid slurry comprises measuring the total weight percent concentration of iron in the acid slurry, performing a potentiometric titration of a portion of the acid slurry in about 65° C. ten percent $H_2SO_4$ solution with dilute ceric bisulfate titrant to determine the amount of titrant to achieve a first end point and a second end point, and wherein said comparing step comprises comparing in normalized units the ratio of the amount of titrant to achieve the first end point to the total weight percent concentration of iron less twice the amount of titrant to achieve the first end point plus the total amount of titrant to achieve the second end point.

5. The method of claim 1 wherein the reduced ion species comprises iron and vanadium, and wherein said steps of measuring the total weight percent concentration of reduced ion species and the total weight percent concentration of oxidized ion species in the acid slurry comprises measuring the total weight percent concentration of iron in the acid slurry, measuring the total weight percent concentration of vanadium in the acid slurry, performing a potentiometric titration of a portion of the acid slurry in about 65° C. ten percent $H_2SO_4$ solution with dilute ceric bisulfate titrant to determine the amount of titrant to achieve a first end point, and wherein said comparing step comprises comparing in normalized units the ratio of the amount of titrant to achieve the first end point to the total weight percent concentration of iron and vanadium less the amount of titrant to achieve the first end point.

6. The method of claim 5 wherein said step of measuring the total weight percent concentration of vanadium comprises the steps of determining the amount of titrant to achieve a second end point, and determining the difference between the amounts of titrant for the first and second end points.

* * * * *